United States Patent [19]

Hall

[11] 4,149,740
[45] Apr. 17, 1979

[54] PIPE COUPLING DEVICE

[75] Inventor: Robert E. Hall, Newport Beach, Calif.

[73] Assignee: W. E. Hall Co., Irvine, Calif.

[21] Appl. No.: 700,825

[22] Filed: Jun. 29, 1976

Related U.S. Application Data

[63] Continuation-in-part of Ser. No. 214,176, Dec. 30, 1971, abandoned.

[51] Int. Cl.² .............................................. F16L 17/04
[52] U.S. Cl. .................................... 285/373; 285/424; 285/DIG. 4
[58] Field of Search .................. 285/373, 419, DIG. 4, 285/364, 365, 366, 367, 406, 407, 410, 411, 424, 233, 234

[56] References Cited

U.S. PATENT DOCUMENTS

| | | | |
|---|---|---|---|
| 577,774 | 2/1847 | Munson | 285/411 |
| 912,638 | 2/1909 | Wold | 285/410 |
| 1,607,943 | 11/1926 | Carson et al. | 285/373 X |
| 2,787,442 | 4/1957 | Lewis | 285/DIG. 4 |
| 3,501,179 | 3/1970 | Boynton et al. | 285/373 |
| 3,669,472 | 6/1972 | Nadsady | 285/233 |

FOREIGN PATENT DOCUMENTS

| | | | |
|---|---|---|---|
| 110743 | 10/1928 | Austria | 285/364 |
| 704902 | 3/1931 | France. | |
| 860626 | 2/1961 | United Kingdom | 285/234 |

Primary Examiner—Dave W. Arola
Attorney, Agent, or Firm—Lyon & Lyon

[57] ABSTRACT

Disclosed herein is a coupler for joining lengths of corrugated pipe including those provided with radial end flanges. The coupler is comprised of two semicircular sections joined at the ends thereof about the juncture of the pipe lengths. Each section has a channeled central portion which is disposed over the ends of the abutting pipe lengths and about the radial end flanges, when provided, and corrugated lateral portions which fit over and mate with the corrugations in the pipe lengths adjacent the ends thereof, thereby forming a strong and durable coupling for the abutting pipe lengths.

9 Claims, 4 Drawing Figures

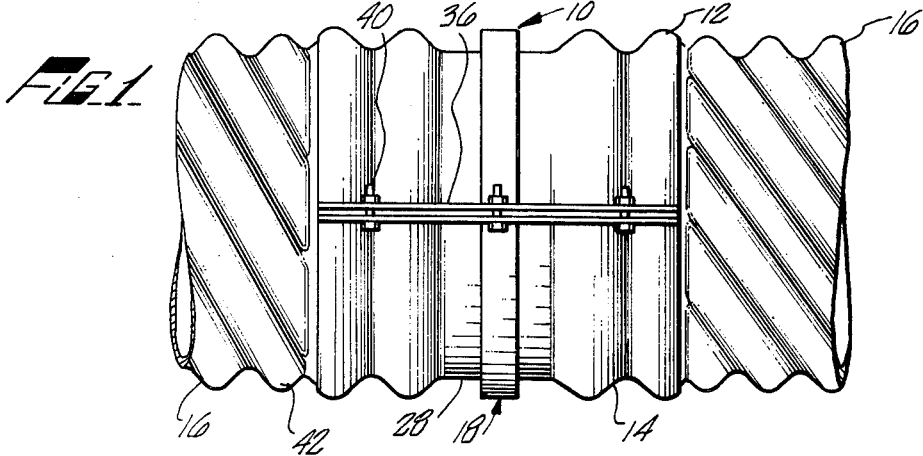
FIG. 1
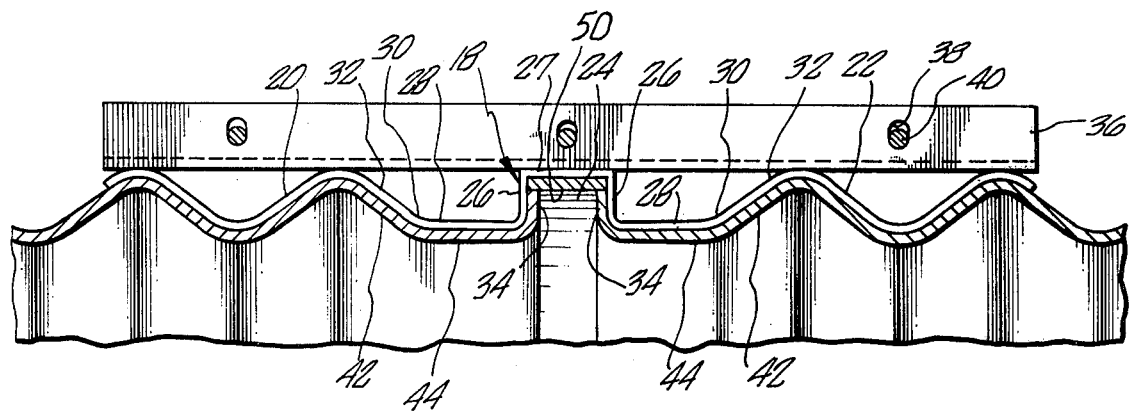
FIG. 2
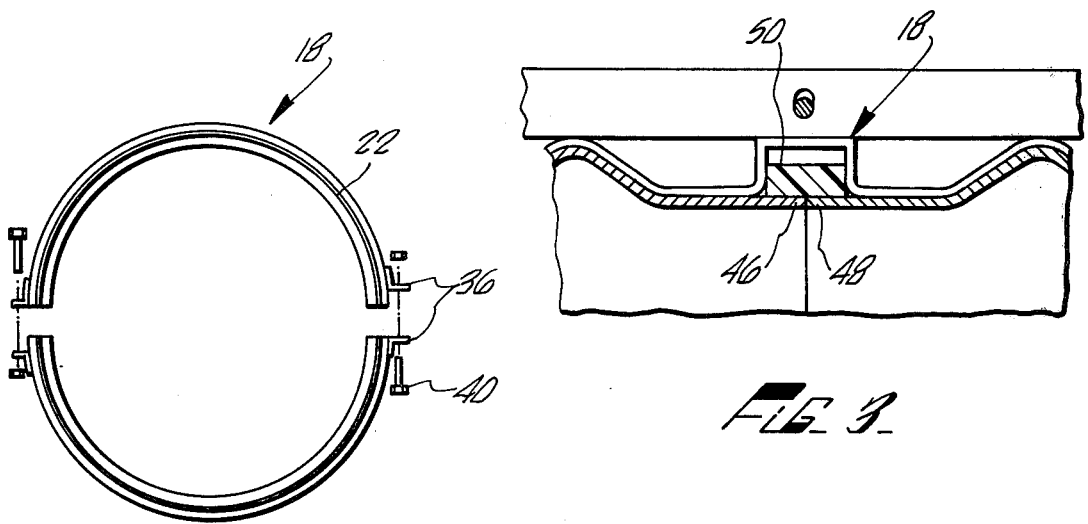
FIG. 3
FIG. 4

PIPE COUPLING DEVICE

This application is a continuation-in-part of the parent application, Ser. No. 214,176, on a "Pipe Coupler," filed on Dec. 30, 1971, now abandoned and refiled on Dec. 26, 1973 as a continuation application, Ser. No. 428,263, entitled "Pipe Coupler," also abandoned and refiled on May 20, 1975 as a continuation-in-part application, Ser. No. 579,200, entitled "Pipe Coupling Device."

BACKGROUND OF THE INVENTION

One of the more important aspects of laying a good pipeline is the obtaining of a strong and durable coupling between the lengths of pipe, and, where necessary, providing a watertight seal to prevent any leakage therethrough. In addition, such a coupling should be as economical as possible, both in construction and in time of installation. The devices currently used for joining two lengths of pipe are called band or split band couplers and generally consist of large band or semicircular band sections (split bands) which are wrapped about the juncture of the adjacent pipe lengths, overlapping a portion of each pipe, and a pair of somewhat large brackets, one being secured to each end of the band or bands. Each bracket has one or more apertures therein for receiving bolt means which extend through the apertures and across the open ends of the band. Upon tightening, the bolt means draws the ends of the band together thereby coupling the pipe lengths.

While these couplers have been widely used for years on corrugated pipe, applicant has recently developed a channeled band coupler which has several advantages over the conventional band or split coupler. The channeled band coupler has a walled channel therein which fits about radial end flanges formed at the ends of the pipe lengths. The use of a channeled band coupler disposed about the abutting or adjacent flanges not only provides a stronger coupling in that it does not rely solely on radial pressure for its holding force, but is also considerably easier to use in the field and therefore more economical.

In joining lengths of pipe, the pipes must be properly aligned prior to coupling to prevent any leakage through the band. Split band couplers are of little assistance in obtaining a proper alignment. Pipe alignment is greatly facilitated by the channeled band coupler with its use of radial end flanges to secure the pipe length as such flanges are self aligning within the channeled couplers. It is also difficult to obtain a watertight seal using the conventional band couplers as the necessary gaskets are quite difficult to hold in place about the juncture of the pipe lengths. This problem is also alleviated by the use of the channeled band coupler as the walled channel is an ideal means for securing a gasket about the abutting pipe ends.

As indicated, the use of the channeled band coupler requires that the pipe lengths be provided with radial end flanges prior to coupling. Accordingly, it may often be necessary to maintain different types of coupling devices for use with flanged or non-flanged pipe. While channeled band couplers can only be used if the pipe lengths are provided with radial end flanges, band couplers can be used to secure lengths of flanged pipe, however, the strength of such a coupling is reduced due to the loss of surface area contact between the bands and pipe lengths caused by the formation of the radial end flange. Not only are the ends of the pipe lengths from which the flanges are formed removed from mating contact with the band coupler but the area on the pipe lengths adjacent the flanges are generally flatened out during the flange forming process for about one to two inches into a non-corrugated surface of generally constant radius which is also removed from contact with the band. The result is a loss of coupling strength when a band coupler is used to secure lengths of flanged pipe. It would be highly desirable to have a single coupling device which retained the benefits of the channel band coupler when used with flanged pipe but which would also provide a strong and durable coupling when used in securing non-flanged pipe.

SUMMARY OF THE INVENTION

Briefly, the invention comprises a coupler for joining lengths of either flanged or non-flanged corrugated pipe, which has a central walled channel portion adapted to fit about the adjacent radial end flanges of the pipe sections when provided and maintain the pipe lengths in axial alignment, or over the abutting pipe ends when not provided; and lateral corrugated portions which fit about and mate with the corrugations of the pipe sections adjacent the ends thereof to firmly hold the pipe lengths in place. A gasket can be disposed within the channel portion of the coupler to provide a strong waterproof seal when desired.

It is the principal object of the present invention to provide a coupler which can be used for joining lengths of both flanged and non-flanged corrugated pipe to provide a strong coupling.

It is another object of the present invention to provide a coupling device for joining lengths of pipe which can provide a watertight seal.

It is yet another object of this invention to provide a coupling device for joining lengths of pipe which is economical to manufacture and simple to install.

It is a still further object of this invention to provide a coupling device for joining lengths of pipe which facilitates proper alignment of the pipes during installation.

It is yet another object of the present invention to provide a device for joining lengths of flanged corrugated pipe which is stronger and more durable than couplers heretofore available.

These and other objects and advantages of the present invention will become apparent from the following detailed description taken in conjunction with the accompanying drawings.

BRIEF DESCRIPTION OF THE DRAWINGS

FIG. 1 is a plan view of the coupler joining two pipe segments.

FIG. 2 is a sectional view of the pipe coupler.

FIG. 3 is a sectional view of the pipe coupler disposed about abutting non-flanged pipe sections and including a gasket therein.

FIG. 4 is a side view of the pipe coupler.

DESCRIPTION OF THE PREFERRED EMBODIMENT

The coupling device 10 is seen to be comprised of a pair of semicircular sections 12 and 14 which are adapted to be disposed about the ends of a pair of abutting lengths of corrugated pipe 16 to securely couple the pipe lengths together, as shown in the drawings. While the coupling device could be of single piece construction for use with smaller diameter pipes, in the preferred embodiment two sections are employed. Each section includes a central portion 18 and a pair of corrugated lateral wing portions 20 and 22 on either side thereof. The central portion 18 has a channel 24 therein which is defined by walls 26 and a spanning member 27 extending therebetween and spacing apart said walls 26 a distance greater than the combined thickness of the radial end flanges 34 of corrugated pipes 16. Each lateral portion includes a lateral spacer or extension 28 which is non-corrugated and of a constant radius, integrally joins the wing portions of each section with the central channeled section and displaces the central channeled portion from the valleys 30 of the adjacent corrugations 32 in the lateral portions 20 and 22.

If the ends of the pipe lengths 16 are provided with radial end flanges 34, as shown in FIG. 2, the flanges of the adjacent pipe lengths are placed in abutting or adjacent relationship and the sections 12 and 14 of the coupler are disposed thereover with the central channels 24 of the sections being positioned about the flanges 34. An angle brace 36 is welded or otherwise affixed to each end of the coupler section which includes one or more apertures 38 therein for receiving bolt means 40. Upon disposing the coupler sections about the abutting end of the pipe lengths as described, the bolt means are tightened, drawing the ends of the sections together and thereby tightening the coupling device 10 about the abutting pipe length.

When the coupling device is secured about lengths of flanged corrugated pipe, the corrugations 32 in the lateral portions 20 and 22 of the coupler sections mate with and bear against the corrugations 42 in the pipe lengths; the lateral extensions 28 of the coupler bear against the flat, cylindrical surfaces 44 on the pipe lengths adjacent the radial end flanges and the base of the channel walls 26 bear against the base of the radial end flanges 34 to provide a strong and durable coupling. In this regard it should be noted that due to the development of more economical methods of construction, corrugated pipe is generally helically or spirally wound as opposed to annularly. Consequently, the ends of the pipe lengths must be recorrugated to provide annular corrugations therein prior to the use of a band coupler having annular corrugations. This recorrugating process imparts this non-corrugated flat or constant radius area 44 to the pipe lengths adjacent the radial end flanges. The lateral extensions 28 of the coupler sections which are disposed between the central portions 18 and the corrugated wing portions 32 not only displace the central channeled portion from the valleys 30 of the adjacent corrugations in the coupler to accomodate the radial end flanges of the pipe lengths and provide a gasket holding means as will be described, but provide continual contact between the coupler and pipe lengths from the mating corrugations to the bases of the radial end flanges thereby increasing the strength of the coupling.

If a pipeline were constructed as above described incorporating flanged pipe and the coupling device 10 were subjected to tensile forces sufficient to cause the mating corrugations to slide laterally with respect to one another, the linear separation of the separate pipe lengths would be prevented by the radial end flanges bearing against the walls 26 of the central portion of the coupling. If such a pipeline were subjected to a substantial loading force which would tend to cause misalignment of the pipe sections, the flanges on one side of the pipe would be forced together while the flanges on the other side of the pipe, downstream of the loading force, would tend to separate and bear against the interior walls of the central channel and thereby prevent further separation and disjunction of the pipeline. In this manner the coupling device 10 utilizes the radial end flanges of the pipe lengths to prevent separation or misalignment of the individual pipe lengths or sections comprising the pipeline when subject to disjunctive forces.

In those instances, as shown in FIG. 3, wherein the pipe lengths are not provided with radial end flanges, the central portion 18 of the coupling device is disposed over the abutting ends 46 and 48 of the pipe lengths and the two lengths are held together under the force of the corrugated lateral wind portions 20 and 22 pressing against the adjacent corrugated pipe lengths. The lateral extensions 28 of the coupler are also in gripping contact with the reformed end portions 44 of the non-flanged pipe to provide continual gripping contact with the pipe lengths up to the channel walls 26 of the coupler.

In those instances where a watertight seal is desired, a gasket 50, which is constructed of neoprene or a suitable rubber-like material, is positioned within the channel 28 and over the abutting ends 46 and 48 of the pipe. In such an installation, the channel walls 26 act to hold the gasket firmly in place and thereby provide an excellent watertight seal. It is of course understood, that a gasket can be similarly employed when the coupling device 10 is used to secure flanged lengths of pipe whereupon the gasket is disposed between the walls of the channel over the ends of the radial flanges. While a flat gasket 50 is illustrated in the drawings, the gasket when used with flanged pipe also could be of a T configuration and extend between the radial end flanges of the adjacent pipe sections as well as thereover.

Various changes and modifications may be made in carrying out the present invention without departing from the spirit and scope thereof. Insofar as these changes and modifications are within the purview of the appended claims, they are to be considered as part of the invention.

I claim:

1. A pipe coupler for connecting adjacent lengths of corrugated pipe provided with radial end flanges, said coupler comprising a central portion having a walled channel therein the walls defining said channel being spaced apart a distance greater than the combined thickness of said end flanges, a pair of lateral wing portions disposed on either side of said central portion and having corrugations therein for mating with the corrugations in said pipe length, a pair of non-corrugated spacer sections extending between and being secured to said central portion and said lateral wing portions and spacing said central portion from said corrugations in said lateral wing portions such that upon securing said coupler about the ends of axially aligned adjacent pipe sections, said coupler is in continual mating contact with said pipe lengths from the extended ends of said lateral wing portions to said channel, said channel is disposed over said radial end flanges and upon said pipe lengths being subjected to a disjunctive force, said flanges undergoing movement within said channel and abutting the walls of said channel to maintain said pipe lengths in adjacent axial alignment, and means for securing said coupler about said adjacent pipe lengths.

2. The combination of claim 1 including a gasket disposed within said channel over the extended ends of said adjacent pipe lengths to provide a watertight seal therebetween.

3. A pipe coupler for connecting adjacent lengths of corrugated pipe provided with radial end flanges, said coupler comprising a pair of coupling members, each of said members having a central portion and a pair of lateral wing portions, said central portion having a flange receiving channel therein defined by a pair of retaining walls, said walls being spaced apart a distance greater than the combined thickness of said end flanges and a spanning member integrally formed with and extending between said retaining walls, said lateral wing portions being secured to and extending outwardly from said retaining walls and having corrugations therein for mating with the corrugations in said pipe lengths, said corrugations in said wing portions being spaced from said retaining walls such that upon said coupling members being secured about the ends of axially aligned adjacent pipe lengths, said members are in continual mating contact with said pipe lengths from the extended ends of said members to said retaining walls, said channel is disposed over said radial end flanges and upon said pipe lengths being subjected to a disjunctive force, said walls undergo movement within said channel and abut said radial end flanges to maintain said pipe lengths in adjacent axial alignment, and means for securing said coupler about said adjacent pipe lengths.

4. The combination of claim 3 including a pair of non-corrugated spacer sections joining said channel walls to said corrugated lateral wing portions of said coupling members for mating with the reformed ends of said pipe lengths having corresponding configurations and thereby maintaining said mating contact between said members and said pipe lengths.

5. The combination of claim 3 including a gasket disposed within said channel over the adjacent ends of said pipe lengths to define a watertight seal in between.

6. The combination of claim 3 wherein said securing means comprises a plurality of angle members, one of said angle members being secured to each end of said coupling members and having at least one aperture therein, and fastening means extending through said apertures, whereby upon tightening said fastening means, said angle members are drawn together thereby tightening said coupling members about said adjacent pipe sections.

7. A pipe coupler for connecting adjacent lengths of corrugated pipe provided with radial end flanges, said coupler comprising a pair of coupling members, each of said members having a central portion, a pair of lateral wing portions, and a pair of constant radius spacer sections secured to and extending between said central portion and said lateral wing portions, said central portion having a flange receiving channel therein defined by a pair of retaining walls, said walls being spaced apart a distance greater than the combined thickness of said end flanges and a spanning member integrally formed with and extending between said retaining walls, said lateral wing portions having corrugations therein for mating with the corrugations in said pipe lengths, said spacer sections joining said channel walls to said corrugated lateral wing portions spacing said receiving channel over the ends of said adjacent pipe lengths and being adapted to mate with the reformed ends of said pipe lengths having a corresponding constant radial configuration such that upon said coupling members being secured about the ends of axially aligned adjacent pipe sections, said members are in continual mating contact with said pipe lengths from the extended ends of said members to said retaining walls, said channel is disposed over said radial end flanges and upon said pipe lengths being subjected to a disjunctive force, said walls undergo movement within said channel and abut said radial end flanges to maintain said pipe lengths in adjacent axial alignment, and means for securing said coupler about said adjacent pipe sections.

8. The combination of claim 7 including a gasket disposed within said channel over the adjacent end of said pipe lengths to define a watertight seal in between.

9. A pipe coupler for connecting adjacent lengths of corrugated pipe provided with radial end flanges, said coupler comprising a central portion having a walled channel therein, the walls defining said channel being spaced apart a distance greater than the combined thickness of said end flanges, and a pair of lateral wing portions being secured to and extending outwardly from said retaining walls and having corrugations therein for mating with the corrugations in said pipe lengths, said corrugations in said wing portions being spaced from said retaining walls such that upon securing said coupler about the ends of axially aligned adjacent pipe sections, said coupler is in continual mating contact with said pipe lengths from the extended ends of said lateral wing portions to said channel, said channel is disposed over said radial end flanges and upon said pipe lengths being subjected to a disjunctive force, said flanges undergoing movement within said channel and abutting the walls of said channel to maintain said pipe lengths in adjacent axial alignment, and means for securing said coupler about said adjacent pipe lengths.

* * * * *